(12) United States Patent
Carroll (10) Patent No.: US 9,239,884 B2
(45) Date of Patent: Jan. 19, 2016

(54) ELECTRONIC DOCUMENT PROCESSING WITH AUTOMATIC GENERATION OF LINKS TO CITED REFERENCES

(75) Inventor: Martin D. Carroll, Watchung, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 834 days.

(21) Appl. No.: 12/125,171

(22) Filed: May 22, 2008

(65) Prior Publication Data

US 2009/0292673 A1    Nov. 26, 2009

(51) Int. Cl.
*G06F 17/30* (2006.01)
*G06F 17/22* (2006.01)

(52) U.S. Cl.
CPC ...... *G06F 17/30882* (2013.01); *G06F 17/2235* (2013.01); *G06F 17/30616* (2013.01); *G06F 17/30637* (2013.01); *G06F 17/30864* (2013.01); *G06F 17/30873* (2013.01)

(58) Field of Classification Search
CPC ............ G06F 17/30616; G06F 17/30864; G06F 17/2235; G06F 17/30882
USPC .......... 707/736, 748, 706, 708, 755; 715/204, 715/249, 733, 229, 200, 246, 219
See application file for complete search history.

(56) References Cited

U.S. PATENT DOCUMENTS

| | | | |
|---|---|---|---|
| 5,822,539 A | 10/1998 | van Hoff | |
| 5,870,552 A * | 2/1999 | Dozier et al. | 709/219 |
| 6,289,342 B1 * | 9/2001 | Lawrence et al. | 1/1 |
| 6,442,549 B1 * | 8/2002 | Schneider | 1/1 |
| 6,567,801 B1 * | 5/2003 | Chiang | G06F 17/30637 |
| | | | 1/1 |
| 6,584,469 B1 * | 6/2003 | Chiang | G06F 17/30637 |
| | | | 1/1 |
| 7,003,719 B1 | 2/2006 | Rosenoff et al. | |
| 7,028,259 B1 * | 4/2006 | Jacobson | 715/236 |
| 7,346,843 B2 * | 3/2008 | Hind | G06F 17/30873 |
| | | | 707/E17.111 |
| 7,487,446 B2 * | 2/2009 | Hargarten et al. | 715/249 |
| 7,584,181 B2 * | 9/2009 | Zeng | G06F 17/30867 |
| | | | 1/1 |
| 7,802,182 B2 * | 9/2010 | Bales | G06F 17/212 |
| | | | 715/200 |
| 7,831,536 B2 * | 11/2010 | Ghosh et al. | 706/46 |
| 8,019,769 B2 * | 9/2011 | Rolle | 707/755 |
| 8,082,241 B1 * | 12/2011 | Pop-Lazarov et al. | 707/708 |
| 8,103,949 B2 * | 1/2012 | Moore et al. | 715/202 |

(Continued)

FOREIGN PATENT DOCUMENTS

| | | |
|---|---|---|
| CN | 101031915 | 9/2007 |
| EP | 0778534 | 6/1997 |

(Continued)

*Primary Examiner* — Frantz Coby (74) *Attorney, Agent, or Firm* — Ryan, Mason & Lewis, LLP (57) ABSTRACT

Links to references cited in a given electronic document are automatically generated in conjunction with processing of the electronic document. In one aspect, which may be implemented at least in part in an otherwise conventional electronic document reader or an associated preprocessor, a reference citation is detected in a first electronic document, the reference citation is processed to determine a link that provides access to a second electronic document identified by the reference citation, and the link and at least a portion of the first electronic document are displayed to a user. The link may be determined by providing one or more designated portions of the reference citation to a search engine and processing results provided by the search engine to determine the link. For example, a search query may be formulated based on the detected reference citation and the search query provided to the search engine.

23 Claims, 3 Drawing Sheets

(56) References Cited

U.S. PATENT DOCUMENTS

| | | | |
|---|---|---|---|
| 8,214,731 B2* | 7/2012 | Lection | G06F 17/3089 715/200 |
| 8,688,701 B2* | 4/2014 | Ghosh et al. | 707/736 |
| 8,805,781 B2* | 8/2014 | Armstrong | 707/614 |
| 2003/0088570 A1* | 5/2003 | Hilbert | H04N 1/00244 1/1 |
| 2003/0187823 A1* | 10/2003 | Ahl | G06F 17/30716 1/1 |
| 2004/0230906 A1* | 11/2004 | Pik | G06F 17/30873 715/229 |
| 2005/0171946 A1* | 8/2005 | Maim | 707/5 |
| 2006/0005113 A1 | 1/2006 | Baluja et al. | |
| 2006/0064394 A1* | 3/2006 | Dettinger et al. | 707/1 |
| 2006/0112340 A1* | 5/2006 | Mohr | G06F 17/30873 715/733 |
| 2007/0005731 A1* | 1/2007 | Lection . | G06F 17/3089 709/219 |
| 2007/0016848 A1 | 1/2007 | Rosenoff et al. | |
| 2008/0055665 A1* | 3/2008 | Moore et al. | 358/448 |
| 2008/0098301 A1* | 4/2008 | Black | H04L 67/1008 715/246 |
| 2008/0320579 A1* | 12/2008 | Rollins et al. | 726/10 |
| 2009/0077024 A1* | 3/2009 | Abraham-Fuchs | G06F 19/322 1/1 |
| 2009/0287988 A1* | 11/2009 | Cohen et al. | 715/204 |
| 2009/0292673 A1* | 11/2009 | Carroll | 707/3 |
| 2012/0072422 A1* | 3/2012 | Rollins et al. | 707/737 |
| 2012/0284282 A9* | 11/2012 | Ghosh et al. | 707/748 |
| 2012/0324349 A1* | 12/2012 | Pop-Lazarov et al. | 715/256 |
| 2015/0032728 A1* | 1/2015 | Rozich et al. | 707/722 |

FOREIGN PATENT DOCUMENTS

| | | |
|---|---|---|
| JP | 2007183833 | 7/2007 |
| WO | WO0043918 | 7/2000 |

* cited by examiner

ELECTRONIC DOCUMENT PROCESSING WITH AUTOMATIC GENERATION OF LINKS TO CITED REFERENCES

FIELD OF THE INVENTION

The present invention relates generally to information processing systems and software and more particularly to the processing of electronic documents.

BACKGROUND OF THE INVENTION

Documents are increasingly being stored and processed in electronic form. In a typical scenario, a document that is stored in a designated electronic format can be "opened" and displayed to a user, utilizing a document reader running on a personal computer or other processor-based device. As a more particular example, electronic documents that are stored in a widely-used format known as portable document format (PDF) can be opened and viewed using an Adobe® Acrobat® document reader commercially available from Adobe Systems Incorporated of San Jose, Calif., U.S.A.

Many documents that are of a technical nature, such as journal articles or other publications in technical fields such as science, engineering and medicine, include numerous references to other documents. For example, a given technical publication may include an extensive list of reference citations, typically in a separate "References" section at the end of the publication. Most of these references may be to other documents that are available as PDF files on the Internet.

Unfortunately, the reference citations provided in a given electronic document are often not in the form of respective uniform resource identifiers (URIs) or other types of links that can be used to directly access the corresponding PDF files over the Internet. Instead, a user who wishes to retrieve an electronic copy of a particular cited reference document typically must first perform a manual Internet search using a search engine such as Google® in order to locate the appropriate link to the desired document. This manual approach is time-consuming, tedious, and error-prone, particularly for the researcher who is conducting an extensive search of the prior literature.

Accordingly, a need exists for an improved approach to processing electronic documents that include reference citations.

SUMMARY OF THE INVENTION

Illustrative embodiments of the present invention provide automatic generation of links to documents referenced in a given electronic document.

In accordance with one aspect of the invention, a reference citation is detected in a first electronic document, the reference citation is processed to determine a link that provides access to a second electronic document identified by the reference citation, and the link and at least a portion of the first electronic document are displayed to a user. The link may be determined by providing one or more designated portions of the reference citation to a search engine and processing results provided by the search engine to determine the link. For example, a search query may be formulated based on the detected reference citation and the search query provided to the search engine. The first electronic document may be modified to include the link to the second electronic document.

An automatic link generation process of the type described above may be implemented in the form of processor-executable software comprising an otherwise conventional electronic document reader or an associated preprocessor.

A given search query implemented as part of the automatic link generation process may be restricted to a particular designated document type, such that the determined link is a link to an electronic document having that designated document type. As another example, the search query may be restricted to a particular designated document portal, such that the determined link is a link to an electronic document that is accessible via the designated document portal. In the latter case, the designated document portal may be a portal for which a particular user is known to have a valid subscription.

The illustrative embodiments provide an efficient automated mechanism for the processing of an electronic document to provide links to its respective reference citations, thereby avoiding the problems associated with the conventional manual approach described above. More specifically, the need for manual searching to identify particular reference documents of interest is eliminated, making retrieval of the referenced documents quick, easy, and error-free.

DETAILED DESCRIPTION OF THE INVENTION

The invention will be described herein in conjunction with illustrative embodiments of processing systems and associated electronic document processing techniques. It should be understood, however, that the invention is not limited to use with the particular processing systems and techniques described, but is instead more generally applicable to any type of processing system application in which it is desirable to facilitate access to reference documents that are cited in a given electronic document.

Figure 1A:
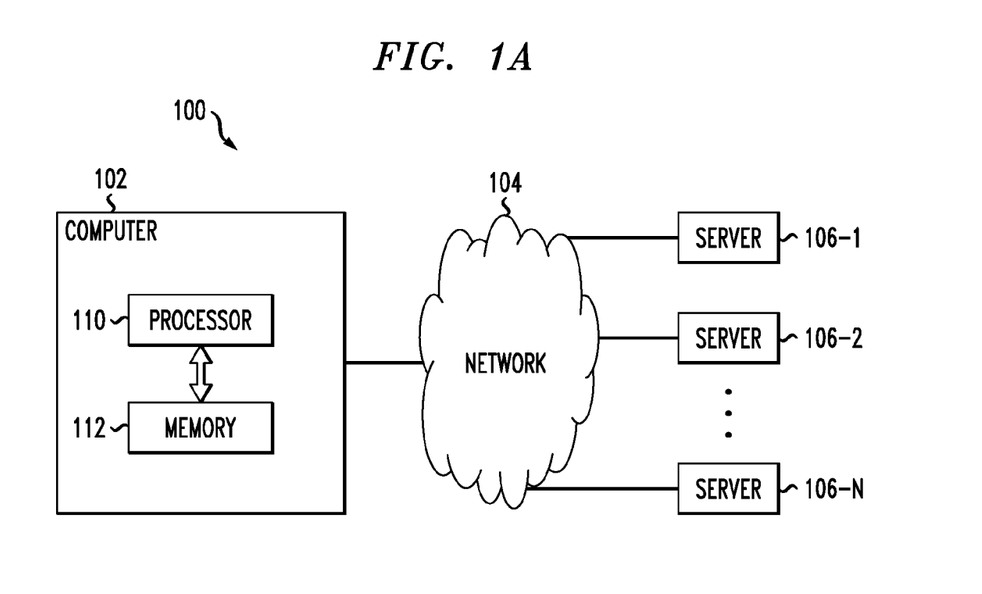
FIG. 1A is a block diagram showing an illustrative embodiment of a processing system in which the present invention is implemented.

FIG. 1A shows an illustrative embodiment of a processing system 100. The system 100 comprises a computer 102 that is coupled via a network 104 to a number of servers denoted 106-1, 106-2, . . . 106-N. The computer 102 comprises a processor 110 coupled to a memory 112. The computer will also typically include additional elements of a conventional nature, such as one or more network interfaces for communicating over the network 104 with one or more of the servers 106.

The processor 110 of computer 102 may comprise, for example, a microprocessor, central processing unit (CPU), digital signal processor (DSP), application-specific integrated circuit (ASIC), or other type of processing device, as well as combinations of such devices. Such a processor will typically comprise internal memory, registers, execution units and other well-known conventional elements.

The memory 112 of computer 102 may comprise, for example, random access memory (RAM), read-only memory (ROM), disk-based memory, or other types of storage elements, in any combination.

The network 104 may comprise, for example, a global communication network such as the Internet, a wireless network such as a wireless local area network (LAN) or wireless metropolitan area network (MAN), a cellular network, a cable network, a satellite network, or other network, as well as combinations of such networks.

Each of the servers 106 may be implemented as a computer or set of computers accessible to the computer 102 over the network 104. Alternative processor-based devices may be used in place of computers to implement one or more of the servers.

The particular arrangement of system elements as shown in FIG. 1A should be viewed as exemplary only. For example, computer 102 in system 100 may be replaced with any other type of processor-based device that can be utilized to view or otherwise process electronic documents, such as a mobile telephone, personal digital assistant (PDA), wireless email device, portable document viewer, etc.

The processing system 100 may further include other elements not explicitly shown in the figure, but commonly included in conventional implementations of such systems. These and other conventional elements mentioned above, being well understood by those skilled in the art, will not be described in detail herein.

The processing system 100 as shown in FIG. 1A is advantageously configured to implement a process for automatically detecting reference citations in an electronic document and displaying associated links to a user. This process in an illustrative embodiment is implemented in software code that is stored in memory 112 and executable by the processor 110. Generally, this processor-executable software code when executed by the processor causes the processor to automatically detect a reference citation in a first electronic document, to process the reference citation to determine a link that provides access to a second electronic document identified by the reference citation, and to display the link and at least a corresponding portion of the first electronic document to a user. The first electronic document may, but need not, be modified to include the link to the second electronic document. The processor-executable software code may be downloaded by computer 102 from one of the servers 106 over the network 104. The software code may alternatively be provided to the computer 102 in other ways, such as by being preinstalled on the computer prior to its purchase by a user, or by being installed from a compact disk inserted in a disk drive of the computer and read by the processor 110 into memory 112.

Figure 1B:
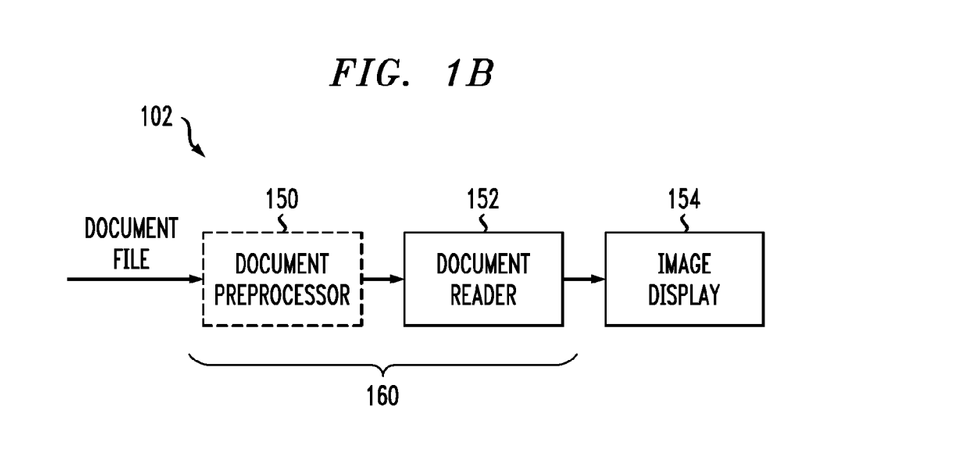
FIG. 1B is a block diagram showing a portion of a computer in the processing system of FIG. 1A.

The above-noted software code may be implemented in conjunction with otherwise conventional electronic document reader software that runs on the computer 102. For example, as illustrated in FIG. 1B, the software code may be implemented in a document preprocessor 150 that processes a document file stored in memory 112. The preprocessor can perform operations such as the automatic detection of reference citations in a given electronic document and the determination of associated links. The output of the document preprocessor 150 may then be applied to a document reader 152, which may be, for example, a conventional document reader such as the previously-mentioned Adobe® Acrobat® document reader. An advantage of this preprocessor embodiment is that is does not require changes to the possibly proprietary code in an existing document reader. The document reader 152 generates image output or other information output that is supplied to image display 154 for presentation to a user of the computer 102 such that the user can view the given electronic document in conjunction with one or more links to reference documents.

Alternatively, the preprocessor 150 may be eliminated, and operations such as the automatic detection of reference citations in a given electronic document and the determination of associated links can be implemented entirely within the document reader 152. Thus, document reader 152 may comprise an otherwise conventional document reader that is modified to incorporate a process for automatic generation of links to reference documents as described herein. Again, the document reader 152 in this case generates image output or other information output that is supplied to image display 154 for presentation to a user of the computer 102, thereby allowing the user to view the given electronic document in conjunction with one or more links to reference documents.

The portion 160 of the computer 102 as shown in FIG. 1B is typically implemented in the form of software. Image display 154 is part of the conventional hardware of the computer, and may comprise, for example, an LCD screen or other type of display as well as associated display driver circuitry. The present invention does not require the use of any particular type of image display device or display process. Any of a wide variety of known display techniques may be used to present an electronic document, or portions thereof, in association with the determined links to its cited reference documents. Thus, the term "image display" as used herein is intended to be broadly construed so as to encompass any type of display suitable for presenting at least a portion of an electronic document in conjunction with an associated link determined in the manner described herein.

Figure 2:
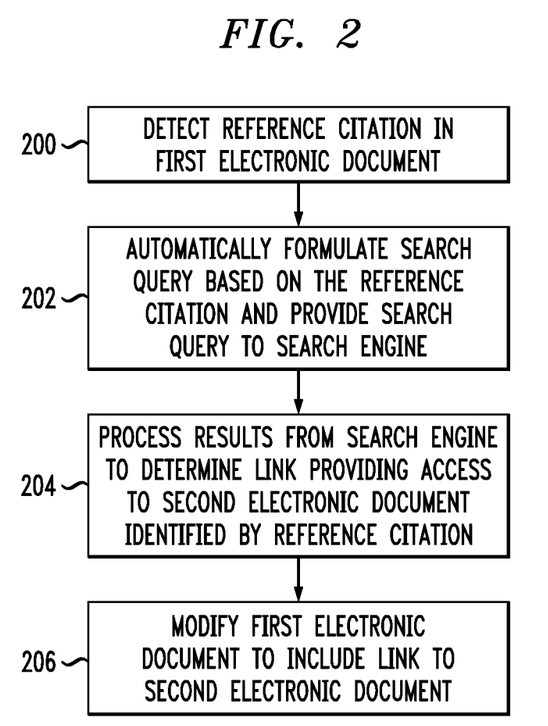
FIG. 2 is a flow diagram of a process for automatic generation of links to reference documents in the FIG. 1A system.

As noted above, a given electronic document may be modified to include links to its reference documents, but such modification is not a requirement of the invention. FIG. 2 shows one illustrative embodiment of an automatic link generation process that is implemented in the system 100 and involves modification of the original electronic document.

In step 200, a reference citation is automatically detected in a first electronic document. The first electronic document may comprise, for example, a typical PDF document that includes a reference section at the end of the document text, with some or all of the reference citations in that section being in the form of text rather than links. The document preprocessor 150 or document reader 152 processes the first electronic document to detect one or more of the textual reference citations, using techniques such as character or word recognition, pattern recognition, etc. Typically the reference citations are in standard citation formats, which may include text fields such as author name(s), title, volume, number, pages, date and so on, and so can be readily identified by appropriately-configured recognition software. Such software may be operative to parse the first electronic document to identify any reference citations that are contained in the document text.

The reference citation detection in step 200 may be initiated, for example, responsive to an opening of the first electronic document by a user of computer 102. Alternatively, it may occur only for particular electronic documents, or portions of one or more such documents, that the user has designated as being subject to automatic generation of links to cited references. For one or more such documents, at least a portion of the process may occur prior to the document being opened.

It should therefore be appreciated that the automatic link generation process of FIG. 2 can be configured to operate either fully automatically (i.e., whenever a given electronic document is opened) or on demand (i.e., whenever the user explicitly requests it, by, e.g., pressing a button or otherwise entering a command). If on-demand operation is used, then its granularity can be anywhere from "entire document" to "single reference" (e.g., generate links for the reference just highlighted by the user) or anything in between (e.g., generate links for all the references on a particular page).

In step 202, a search query is automatically formulated based on a particular reference citation detected in step 200 and the formulated search query is provided to a search engine such as Google®. For example, at least a portion of the reference citation, such as the title or part of the title in conjunction with additional information such as author name(s) and date of publication, may be used to populate corresponding fields in a search form provided by the search engine. The search engine may be provided via a web page or set of web pages that are accessed via a web browser running in the background of the document preprocessor 150 or document reader 152. It should be noted in this regard that these elements may alternatively be configured such that the search engine can be accessed without the use of a full web browser, using well-known programming techniques.

The search query may be restricted to particular document types or document sources. For example, the search query may be restricted to only return PDF documents, as those documents may be preferred by certain users. As another example, the search query may be restricted to a particular designated document portal, such as an Institute of Electrical and Electronics Engineers (IEEE) portal or an Association for Computing Machinery (ACM) portal, for which the user is known to have a valid subscription. A more detailed example of the latter arrangement will be described below in the context of FIG. 4. Other search restrictions may also or alternatively be used. For example, if the reference citation contains a publication date, the search could be configured to search for not only a document with the specified publication date, but also for additional versions of the document that are later (or earlier) than the cited date. In many cases the user will want to read the latest version, regardless of what version is cited. Search restrictions of the type described above can be implemented using the advanced search features of typical search engines such as Google®.

In step 204, search results provided by the search engine responsive to the search query are processed to determine a link that provides access to a second electronic document identified by the particular reference citation. The link may be, for example, a link suitable for use in a web browser of computer 102 to obtain access to the corresponding electronic document from one of the servers 106 over the network 104. Thus, the link determined in step 204 is typically a uniform resource indicator (URI), which may more specifically comprise a uniform resource locator (URL) or uniform resource name (URN), that when "clicked" on or otherwise actuated by a user of computer 102 causes the computer to access the corresponding electronic document over the network 104. Other types of links to reference documents may be used in other embodiments. Also, the URI or other link returned by the search engine could refer to a document stored somewhere on the user's local area network, corporate network, the Internet, or some other network. Further, different URIs or other links returned by the search engine can refer to documents in different networks.

In step 206, the first electronic document is modified to include the link to the second electronic document, assuming that such a link is identified in step 204. Thus, the reference citation that was detected in the text of the first electronic document in step 200 is now associated with a link to the second electronic document, which considerably facilitates access to that second electronic document to one viewing the first electronic document on image display 154 of computer 102. The modification of the first electronic document may involve, for example, replacing at least a portion of the detected reference citation in the first electronic document with the link to the second electronic document. Thus, the detected reference citation may be replaced in its entirety with the corresponding link to the second electronic document. Alternatively, the link to the second electronic document may simply be inserted immediately following the reference cite citation in the first electronic document, such that the text of the original reference citation is preserved in its entirety. The modified first electronic document may be stored in place of the original first electronic document in the memory 112.

Although the FIG. 2 process is illustrated for a single detected reference citation, the steps may involve processing multiple detected reference citations, in parallel or serially. For example, multiple reference citations may be detected in the text of the first electronic document in step 200, with steps 202, 204 and 206 being configured such that each of the detected reference citations is automatically replaced with a link to the corresponding electronic document accessible over the network 104.

It should be noted that the search results may include multiple links for the given reference citation. The document preprocessor 150 or document reader 152 are preferably configured to determine which of such multiple links is likely to provide the most desirable link for a given user. This determination may be based, for example, on user preferences that are gathered by the computer 102 via an appropriate user interface. A single one of the multiple links may therefore be chosen for incorporation into the first electronic document in step 206. Alternatively, two or more of the multiple links may be incorporated into the first electronic document, and may be ordered based on system rules or user preferences. It is also possible that a given search may return no links for the given reference citation, for example, if there is no electronic document corresponding to the citation in question that is accessible over the Internet. In such a situation, the process may terminate for that reference citation at step 204 without any modification to the corresponding text of the first electronic document.

The automatic link generation process of FIG. 2 may also be configured to permit the user to select regeneration of links that have been previously generated. This is because documents available over the Internet can change over time, and a user may believe (or know) that there is now a later (or better) version of a given cited reference somewhere on the Internet. Thus, the process may allow the user to manually force a link update, by selection of a corresponding option in a user interface.

It is to be appreciated that the particular process steps shown in the flow diagram of FIG. 2 are not requirements of the invention, and alternative embodiments may utilize other processing operations to provide automatic generation of links to cited references in a given electronic document.

For example, as indicated previously, the modification of the original electronic document as shown in step 206 is optional. In alternative embodiments, the document reader 152 could be configured to present the generated links to the user without actually modifying the document itself. The generated links could be presented in a variety of different ways. In one possible embodiment, the reader could be configured to make it appear as if the links had been inserted into the document without actually modifying the document itself. In another embodiment, the reader could be configured to present the generated links in a list off to the side of the document display. If this latter approach is used, then the document reader could further provide a visual indication to the user that links to the reference citation have been found and are available in a sidebar.

In these and other embodiments in which the original electronic document is not modified, the document reader or other system element can be configured to save the information about the generated links in a separate file. Then, every time the user opens the document, the document reader also privately opens the separate file to recover the link information and present it to the user. Alternatively, the document reader could simply throw away the generated link information whenever the document reader is closed.

Figure 3:
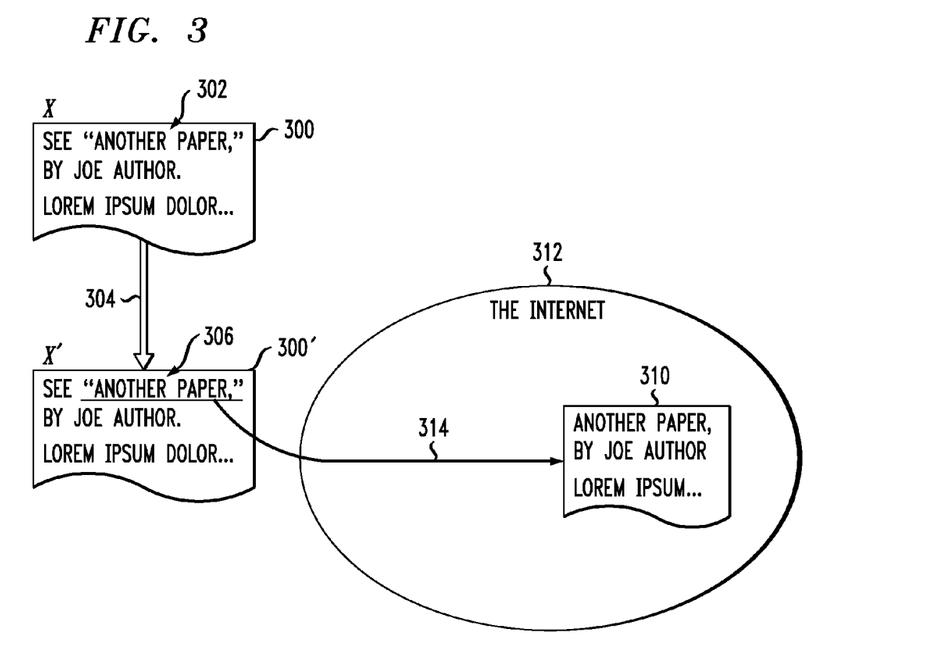
FIG. 3 is a diagram illustrating one possible implementation of the FIG. 2 process in the FIG. 1A system.

FIG. 3 illustrates one possible implementation of the FIG. 2 automatic link generation process in the system 100 of FIG. 1A. In this example, network 104 of FIG. 1A is assumed to be the Internet. A first electronic document 300, also denoted document X, includes a reference citation 302. The reference citation is to a reference entitled "Another Paper" by an author identified as "Joe Author." The first electronic document X is modified via process 304 to produce a modified first electronic document 300', also denoted document X', which includes a modified reference citation 306. The process 304 generally includes steps 200 through 206 as described in conjunction with FIG. 2. In the modified reference citation 306, at least a portion of the original reference citation 302 is replaced with a link to a second electronic document 310 that is identified by the reference citation. The modified first electronic document X' is presented to the user of computer 102 via the image display 154 in place of the original first electronic document X. The user can then click on or otherwise actuate the link provided in the modified electronic document X' in order to access the referenced document 310 over the Internet 312 via a network connection 314.

Figure 4:
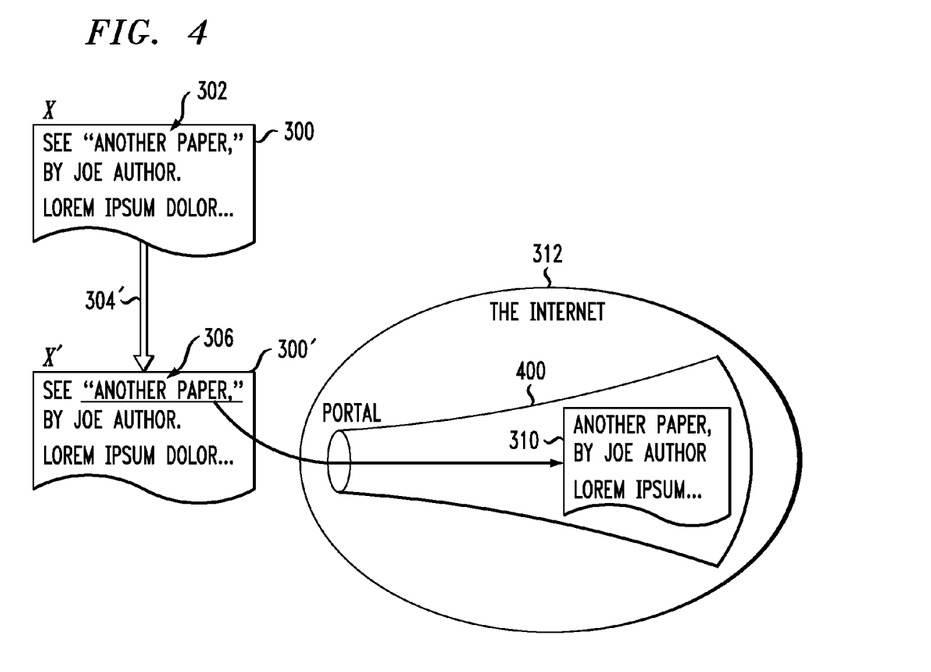
FIG. 4 is a diagram illustrating another possible implementation of the FIG. 2 process in the FIG. 1A system.

As mentioned previously, it is possible that the search formulated in step 202 of the FIG. 2 process may be restricted in various ways in order to ensure that most appropriate links are placed in the modified electronic document. FIG. 4 shows a version of the FIG. 3 example in which the search is limited to a particular portal 400 for which the user is known to have a valid subscription. As is well known, certain technical organizations, such as the IEEE or ACM, have document portals on the Internet through which members having valid subscriptions can access electronic documents published by the respective organizations. Even if a PDF for the referenced document happens to be available without going through a portal, many users will prefer to access the version of the document that is accessible via a portal, because a portal usually points at the latest or "most official" version of the document.

The user can provide portal subscription information as part of his or her user preferences via an appropriate user interface of the computer 102, and that information may then be used to limit the search queries implemented in the FIG. 2 process. The resulting process 304' in FIG. 4 results in determination of a link in which the referenced document 310 is accessed via the identified portal 400. A given user (or his or her employer) may have subscriptions to multiple portals. The search can, if desired, be limited to such portals, or a subset of such portals. If the search via the designated portal(s) fails, then the process can fall back on an unrestricted search.

In many corporate scenarios, the user will not have to specify portal information to the system, because the corporate network is already configured such that the user's search engine has automatic access to all subscribed portals. Even in such a case, however, the system may still have to sort the returned URIs, to place the portal-accessible URIs first in the list. This portals-come-first sorting operation can be implemented without requiring any input from the user, because the system can be preconfigured to recognize URIs corresponding to the most common portals (e.g., IEEE, ACM).

A document reader or other set of software implementing an embodiment of the present invention may be configured to solicit the above-noted user preference information via one or more interface screens presented to the user on the image display 154. Such interfaces may also be utilized to provide user selection between a normal document reader mode of operation, in which a given electronic document is presented on image display 154 without inclusion or other presentation of any links to cited references, and an enhanced document reader mode of operation in which one or more such links are presented for respective cited references. As another possible alternative, a given link may be provided as so-called "hover text" that is presented only when a user brings a cursor into proximity of the reference citation text. This arrangement is an example of an embodiment in which the electronic document need not be modified to include the links to the reference citations.

The particular processing arrangements shown in FIGS. 2 through 4 should be viewed as illustrative examples of automatic reference link generation techniques suitable for use in the processing system 100 of FIG. 1A. It is to be understood that the invention can be implemented using alternative techniques, implemented using a wide variety of alternative hardware, software and firmware components.

The various embodiments of the present invention as described above advantageously facilitate the retrieval of cited documents that are referenced within PDF files or other types of electronic documents. The prior need for manual searching to identify particular reference documents of interest is eliminated, making retrieval of referenced documents quick, easy, and error-free.

It should again be emphasized that the above-described embodiments are intended to be illustrative only. For example, the processing system configuration of FIGS. 1A and 1B and the automatic link generation process of FIG. 2 can be altered in other embodiments. Also, various system features, such as the particular type of electronic documents used, the configuration of their associated readers or preprocessors, and the manner in which automatically generated links are presented to a user, can be altered in other embodiments. These and numerous other alternative embodiments within the scope of the following claims will be readily apparent to those skilled in the art.

I claim:

1. An apparatus comprising:
   a processor;
   a memory coupled to the processor; and
   a display;
   wherein the memory stores a first electronic document; and
   wherein the processor is operative:
      to detect a reference citation in the first electronic document;
      to process the reference citation to determine a plurality of links to a second electronic document identified by the reference citation, each of the plurality of links comprising a uniform resource identifier (URI) for directly accessing the second electronic document; and
      to select at least one of the plurality of links based on preference information, and to control presentation of the selected at least one link and at least a portion of the first electronic document on the display; and wherein the processor is operative to process the reference citation to determine the plurality of links by:
formulating a search query based on the reference citation;
identifying a plurality of document portals, the plurality of document portals comprising a first subset of document portals for which a particular user is known to have a valid subscription and a second subset of document portals for which a particular user is not known to have a valid subscription;
restricting the search query to the first subset of the plurality of document portals;
executing the restricted search query; and
in the event that executing the restricted search query fails, executing an unrestricted search query to search the second subset of the plurality of document portals.

2. The apparatus of claim 1 wherein the reference citation is detected and the links are determined in a document reader running on the processor.

3. The apparatus of claim 1 wherein the reference citation is detected and the links are determined in a document preprocessor running on the processor.

4. The apparatus of claim 1 wherein a first one of the plurality of links is associated with a first version of the second electronic document, a second one of the plurality of links is associated with a second version of the second electronic document, and the processor is operative to select at least one of the plurality of links by selecting one of the first one of the plurality of links and the second one of the plurality of links based at least in part on user preferences relating to first and second document portals associated with the respective first and second ones of the plurality of links.

5. The apparatus of claim 1 wherein at least one of the restricted search query and the unrestricted search query is limited to a particular designated document format and a given one of the determined links is a link to an electronic document having that designated document format.

6. A computer program product comprising a non-transitory computer-readable storage medium having program code embodied therein, wherein execution of the program code by a processor causes the processor:
to detect a reference citation in a first electronic document;
to process the reference citation to determine a plurality of links to a second electronic document identified by the reference citation, each of the plurality of links comprising a uniform resource identifier (URI) for directly accessing the second electronic document;
to select at least one of the plurality of links based on preference information; and
to control display of the selected at least one link and at least a portion of the first electronic document;
wherein the program code when executed causes the processor to process the reference citation to determine the plurality of links by:
formulating a search query based on the reference citation;
identifying a plurality of document portals, the plurality of document portals comprising a first subset of document portals for which a particular user is known to have a valid subscription and a second subset of document portals for which a particular user is not known to have a valid subscription;
restricting the search query to the first subset of the plurality of document portals;
executing the restricted search query; and
in the event that executing the restricted search query fails, executing an unrestricted search query to search the second subset of the plurality of document portals.

7. The computer program product of claim 6 wherein the program code is stored in a memory coupled to the processor.

8. The computer program product of claim 6 wherein the program code is stored in a server accessible to the processor over a network.

9. The computer program product of claim 6 wherein a first one of the plurality of links is associated with a first version of the second electronic document, a second one of the plurality of links is associated with a second version of the second electronic document, and the processor is operative to select at least one of the plurality of links by selecting one of the first one of the plurality of links and the second one of the plurality of links based at least in part on user preferences relating to first and second document portals associated with the respective first and second ones of the plurality of links.

10. The computer program product of claim 6 wherein at least one of the restricted search query and the unrestricted search query is limited to a particular designated document format and a given one of the determined links is a link to an electronic document having that designated document format.

11. A processor-implemented method comprising the steps of:
detecting a reference citation in a first electronic document;
processing the reference citation to determine a plurality of links to a second electronic document identified by the reference citation, each of the plurality of links comprising a uniform resource identifier (URI) for directly accessing the second electronic document;
selecting at least one of the plurality of links based on preference information; and
displaying the selected at least one link and at least a portion of the first electronic document;
wherein processing the reference citation to determine the plurality of links comprises:
formulating a search query based on the reference citation;
identifying a plurality of document portals, the plurality of document portals comprising a first subset of document portals for which a particular user is known to have a valid subscription and a second subset of document portals for which a particular user is not known to have a valid subscription;
restricting the search query to the first subset of the plurality of document portals;
executing the restricted search query; and
in the event that executing the restricted search query fails, executing an unrestricted search query to search the second subset of the plurality of document portals.

12. The method of claim 11
wherein a first one of the plurality of links is associated with a first version of the second electronic document, a second one of the plurality of links is associated with a second version of the second electronic document, and selecting at least one of the plurality of links comprises selecting one of the first one of the plurality of links and the second one of the plurality of links based at least in part on user preferences relating to first and second document portals associated with the respective first and second ones of the plurality of links.

13. The method of claim 11 further comprising the step of modifying the first electronic document to include the selected at least one link to the second electronic document.

14. The method of claim 13 wherein the modifying step comprises replacing at least a portion of the reference citation in the first electronic document with the selected at least one link to the second electronic document.

15. The method of claim 11 wherein executing the search query comprises providing at least a portion of the reference citation to a search engine and processing results provided by the search engine to determine the links.

16. The method of claim 15 wherein the portion of the reference citation comprises at least a portion of a document title specified in the reference citation.

17. The method of claim 11 wherein at least one of the restricted search query and the unrestricted search query is limited to a particular designated document format and a given one of the determined links is a link to an electronic document having that designated document format.

18. The method of claim 11 wherein the step of detecting the reference citation in the first electronic document comprises parsing the first electronic document to identify a plurality of reference citations.

19. The method of claim 18 wherein the processing step is repeated for each of the plurality of reference citations to determine respective pluralities of links to corresponding electronic documents.

20. The method of claim 19 wherein the displaying step comprises displaying at least a portion of the first electronic document in association with links to the electronic documents that correspond to respective ones of the reference citations.

21. The method of claim 11 wherein the selected link comprises a URI for accessing the second electronic document over the Internet.

22. The method of claim 11 wherein the detecting and processing steps are implemented at least in part in a document reader.

23. The method of claim 11 wherein the detecting and processing steps are implemented at least in part in a document preprocessor associated with a document reader.

\* \* \* \* \*